US009727143B1

(12) United States Patent
Lee et al.

(10) Patent No.: US 9,727,143 B1
(45) Date of Patent: Aug. 8, 2017

(54) DEVICE STYLUS HAPTIC COMMUNICATION SYSTEM

(71) Applicant: Amazon Technologies, Inc., Seattle, WA (US)

(72) Inventors: Michael Martin Lee, San Jose, CA (US); David Charles Buuck, Prunedale, CA (US); Leo John Geskey, San Jose, CA (US); Patrick Robert Foo, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/299,070

(22) Filed: Oct. 20, 2016

Related U.S. Application Data

(63) Continuation of application No. 14/132,839, filed on Dec. 18, 2013, now Pat. No. 9,495,011.

(51) Int. Cl.
*G06F 3/033* (2013.01)
*G06F 3/041* (2006.01)
*G06F 3/01* (2006.01)
*G06F 3/0354* (2013.01)

(52) U.S. Cl.
CPC .......... *G06F 3/016* (2013.01); *G06F 3/03545* (2013.01); *G06F 3/041* (2013.01)

(58) Field of Classification Search
CPC ...... G06F 3/016; G06F 3/0433; G06F 3/0436; G06F 3/03545; G06F 3/044; G06F 3/041; G06F 3/04883; G06F 3/0317; G06F 3/0321

USPC .............. 345/156, 173, 174, 179; 178/18.01, 178/18.03–18.07, 19.01–19.04
See application file for complete search history.

(56) References Cited

U.S. PATENT DOCUMENTS

| | | | | |
|---|---|---|---|---|
| 6,441,810 | B1 * | 8/2002 | Skoog ................. | G06F 3/03545 178/19.01 |
| 9,383,839 | B1 * | 7/2016 | Rost ..................... | G06F 3/03545 |
| 9,547,381 | B2 * | 1/2017 | Choi ....................... | G06F 3/041 |
| 2007/0165912 | A1 * | 7/2007 | Liu ...................... | G06F 3/03545 382/120 |
| 2009/0172823 | A1 * | 7/2009 | Maor ...................... | G06F 21/83 726/29 |
| 2009/0207137 | A1 * | 8/2009 | Tan ....................... | G06F 3/0317 345/166 |
| 2011/0050618 | A1 * | 3/2011 | Murphy ................ | G06F 1/3215 345/174 |
| 2011/0087870 | A1 * | 4/2011 | Spangler ............... | G06F 21/554 713/2 |

(Continued)

*Primary Examiner* — Rodney Amadiz
(74) *Attorney, Agent, or Firm* — Pierce Atwood LLP

(57) ABSTRACT

Computing devices are disclosed that use haptic technology to communicate data to a stylus device. This data may include, for example, updates to the stylus device, instructions on how the stylus should behave, authentication and identification information, and other data. This communication may also allow a stylus to implement security features and copy and paste functionality from one user device to another. In an aspect, the computing device includes a haptic element that provides a vibration force to the device or touchscreen of the device, and communicates data embedded on a carrier to the stylus. The stylus receives the vibration force through a pressure sensor on the stylus and used the information to enhance the user experience.

16 Claims, 10 Drawing Sheets

(56) References Cited

U.S. PATENT DOCUMENTS

2012/0182212 A1* 7/2012 Hsueh .................. G06F 3/033
    345/156
2012/0299866 A1* 11/2012 Pao ....................... G06F 3/044
    345/174
2014/0267078 A1* 9/2014 Kukulski ............. G06F 3/0416
    345/173
2015/0177868 A1* 6/2015 Morein .................. G06F 3/044
    345/174
2015/0363012 A1* 12/2015 Sundara-Rajan ....... G06F 3/038
    345/179

\* cited by examiner

DEVICE STYLUS HAPTIC COMMUNICATION SYSTEM

CROSS-REFERENCE TO RELATED APPLICATION

This application is a continuation of, and claims the benefit of priority of, U.S. Non-provisional patent application Ser. No. 14/132,839, filed Dec. 18, 2013 and entitled "DEVICE-STYLUS HAPTIC COMMUNICATION SYSTEM," the contents of which is expressly incorporated herein by reference in its entirety.

BACKGROUND

With the advancement of technology, the use and popularity of electronic devices, such as mobile devices, has increased considerably. Mobile devices, such as smart phones and tablet computers, typically have touch screens that enable a user to operate the devices by touching the screen with a finger or stylus type device. Stylus devices can mimic the use of familiar writing tools, such as pens and pencils. While most stylus devices are capable of communicating to the mobile devices, the mobile devices typically do not communicate back to the stylus devices.

BRIEF DESCRIPTION OF DRAWINGS

For a more complete understanding of the present disclosure, reference is now made to the following description taken in conjunction with the accompanying drawings.

DETAILED DESCRIPTION

Figure 1:
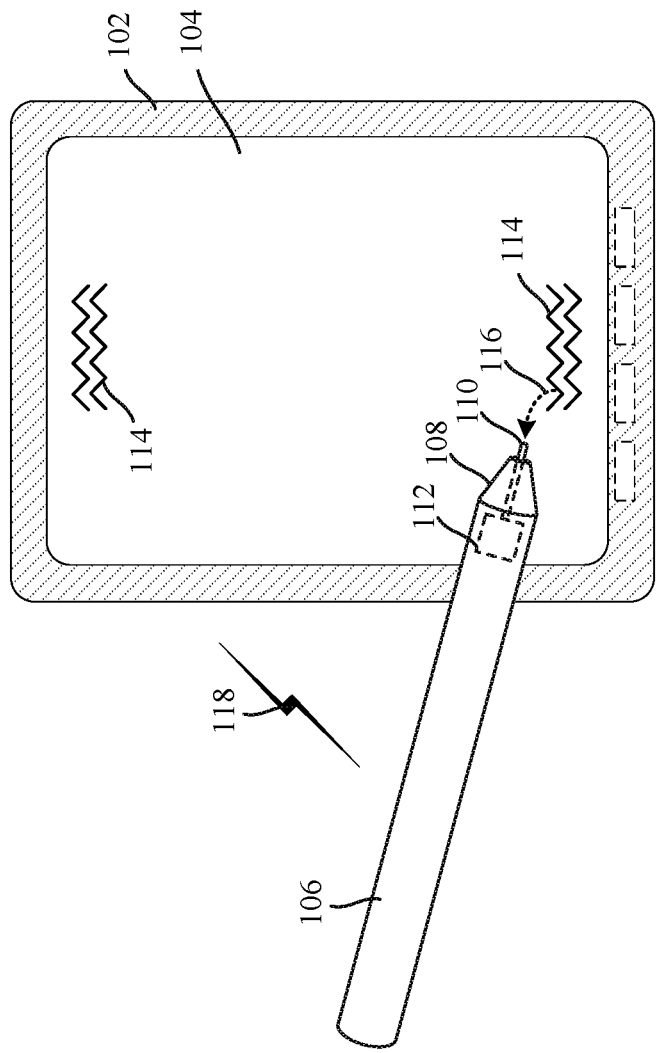
FIG. 1 illustrates a device-stylus haptic communication system according to one aspect of the disclosure.

One drawback to operating a computing device with a stylus is the general one-way communication of such operations where a stylus (through user control, a radio transmitter, or the like) communicates with the computing device but the computing device typically does not have the ability to communicate with the stylus. If two-way communication were enabled, it would allow the implementation of many more features and customization of stylus-device operations. Certain existing systems may enable such two-way communications, but those systems presently require a stylus with advanced receiving capabilities and components such as a radio receiver to receive wireless communications (e.g., Bluetooth, WiFi, etc.) by the stylus. Including such components in a stylus generally renders the stylus more difficult (and expensive) to manufacture, thus increasing the cost to a consumer. This cost increase may make the stylus prohibitively expensive, particularly when a passive stylus (or substitute) may be obtained at little cost, a stylus may be easily lost or broken, the increased functionality may not justify the increased cost, etc.

Offered is a stylus capable of receiving communications from a computing device (and implementing accompanying improved functionality) using components and methods that are less expensive to implement than wireless reception. Specifically, the user devices disclosed herein use haptic technology to communicate data to stylus devices. Haptic technology relates to a tactile feedback technology that uses physical contact to apply forces or vibrations. Haptic communications are communications that flow from one device to another using forces, movement, and/or vibrations that are detectable by components such as a pressure sensor, vibration sensor, or the like. Data communicated using the haptic technology may include, for example, updates to the stylus device, instructions on how the stylus should behave, authentication and identification information, and other data. This communication may also allow a stylus to implement security features and copy and paste functionality from one user device to another. Other functionality may also be configured.

In one aspect, a stylus device, such as an active type stylus, includes an active tip including a pressure sensor. The active tip detects its position in relation to a user device (such as the X-Y coordinate position of the tip on a touchscreen of the user device), and the stylus device communicates that position to the user device. The stylus may also communicate additional information to the user device, for example, power level, operating mode, etc. This communication may be in the form of a radio frequency (RF) signal, an infrared (IR) signal, or combinations of one or more of these techniques.

In general, the user devices disclosed herein include one or more haptic elements adapted to send data via vibrations to the stylus device, and the stylus device may communicate data to the user device using radio frequency (RF) or infrared (IR) signals. By actuating the touch surface or touchscreen of the user device while the actuated surface is in contact with the stylus, data can be communicated to the stylus device through the pressure sensor or through another component, such as a microelectromechanical systems (MEMS) microphone implemented in the stylus device.

Aspects of the present disclosure include devices, systems and methods for haptic communication between a user device, such as a computing device, a laptop computer, a cellular phone, a personal digital assistant (PDA), a tablet computer, other mobile devices, etc., and a stylus device. The following description provides exemplary implementations of the disclosure. Persons having ordinary skill in the field of computers will recognize components and process steps described herein that may be interchangeable with other components or steps, or combinations of components or steps, and still achieve the benefits and advantages of the present disclosure. Moreover, in the following description, numerous specific details are set forth in order to provide a thorough understanding of the disclosure. It will be apparent to one skilled in the art, however, that the disclosure may be practiced without some or all of these specific details. In other instances, well-known process steps have not been described in detail in order not to unnecessarily obscure the disclosure.

FIG. 1 illustrates a system overview according to an aspect of the disclosure. A user device 102 including a touchscreen 104 utilizes haptic technology to communicate data to a stylus device 106 through haptic force-feedback effects, such as applying forces, vibrations, or motions. In an aspect, haptic force-feedback effects include the injection of a narrow band of vibratory energy into a touchscreen 104 and/or a chassis of the user device 102. For example, in devices where a suspended touchscreen can be or is implemented (meaning the touch-sensing surface can be arranged to translate independently with respect to the device chassis), actuation (i.e. using a vibrotactile actuator) of the touchscreen can be accomplished in X, Y, or Z axes, or in a combination of all three, depending upon the capabilities of the suspension system and the coupled driving actuators. Actuation normal to the X or Y axes (referred to as vibrotactile shear-mode excitation) can provide haptic feedback largely without the emission of audible noise that may distract a user.

In another example, a pulse driven mass force approach may be used to create the vibratory energy. In this example, a haptic element, such as an inertial actuator, may be connected to the user device 102 using conventional ports, such as USB, etc., or imbedded into the computing device 200 itself This haptic element may provide inertial actuation, using an inertial actuator, of the user device 102 to communicate data to the stylus device 106. A hybrid approach may also be used in which both of inertial and vibrotactile actuation or excitation are used.

As illustrated, the stylus device 106 includes an active tip 108 including a pressure sensitive tip 110 coupled to a pressure sensor 112 or vibration sensor. In an aspect, the user device 102 detects physical contact between the touchscreen 104 and a stylus device 106, and causes the touchscreen 104 to vibrate, illustrated by vibration lines 114. The touchscreen may vibrate at a particular frequency (called a haptic frequency) to transmit information via haptic contact with the stylus. The stylus device receives the vibration communications, illustrated as arrow 116, using the pressure sensitive tip 110 and pressure sensor 112. The stylus may also send an acknowledgment of the received vibration communications, through wireless communications illustrated as 118, back to the user device 102. In an aspect, a modulation/demodulation approach may be used to communicate data to the stylus 106 via the haptic frequency. For example, a carrier based lock in amplifier approach may be used to transmit or communicate data to the stylus device 106 via the haptic frequency. In this aspect, when performing the communication from the user device 102 to the stylus device 106, a data bit stream being communicated may be superimposed on top of a haptic carrier wave. For example, the carrier wave may be modulated, using frequency or amplitude modulation, with the data bit stream to transmit the data using the haptic frequency.

Figure 2:
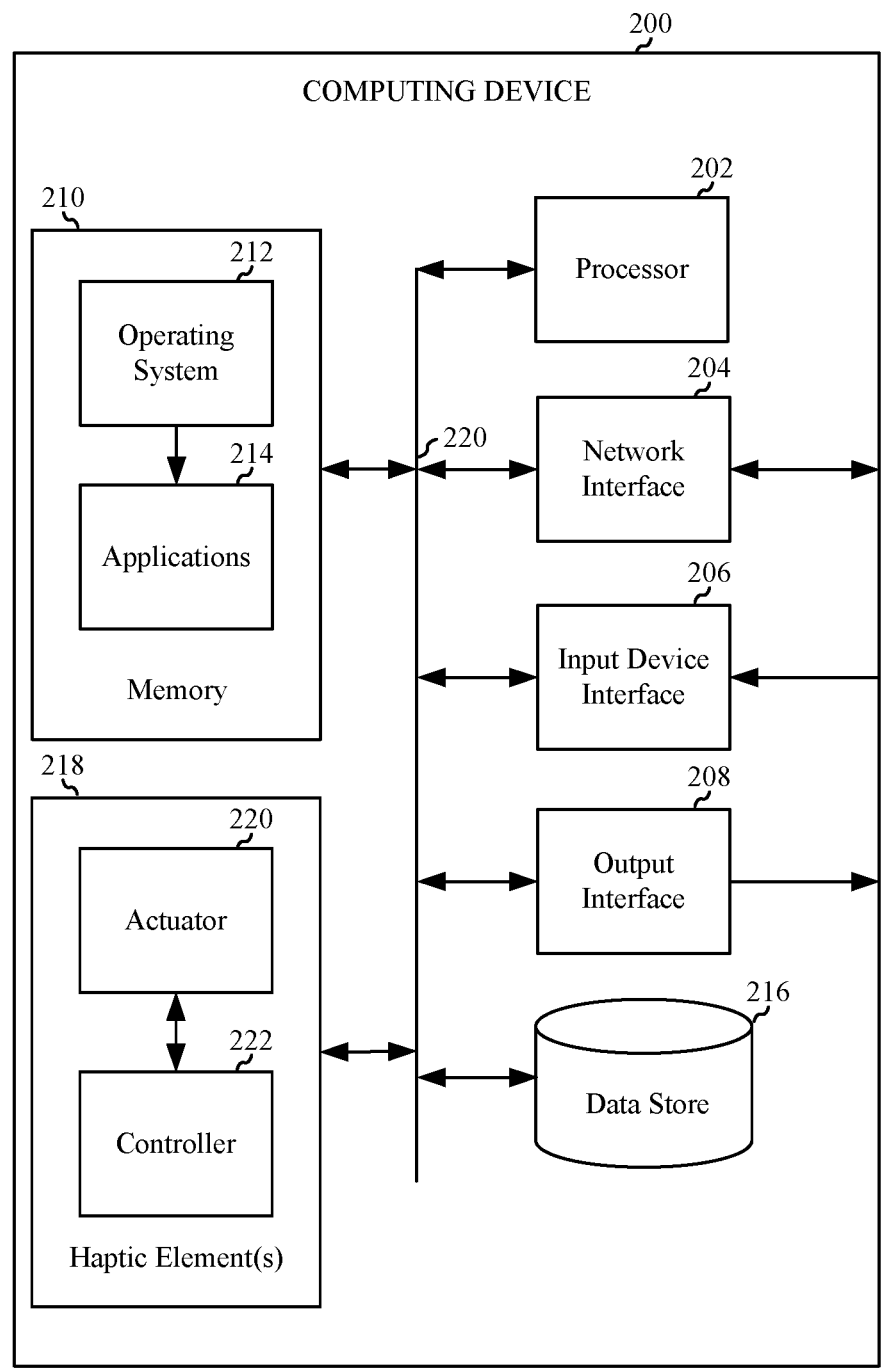
FIG. 2 illustrates a block diagram conceptually illustrating a computing device according to one aspect of the present disclosure.
Figure 3:
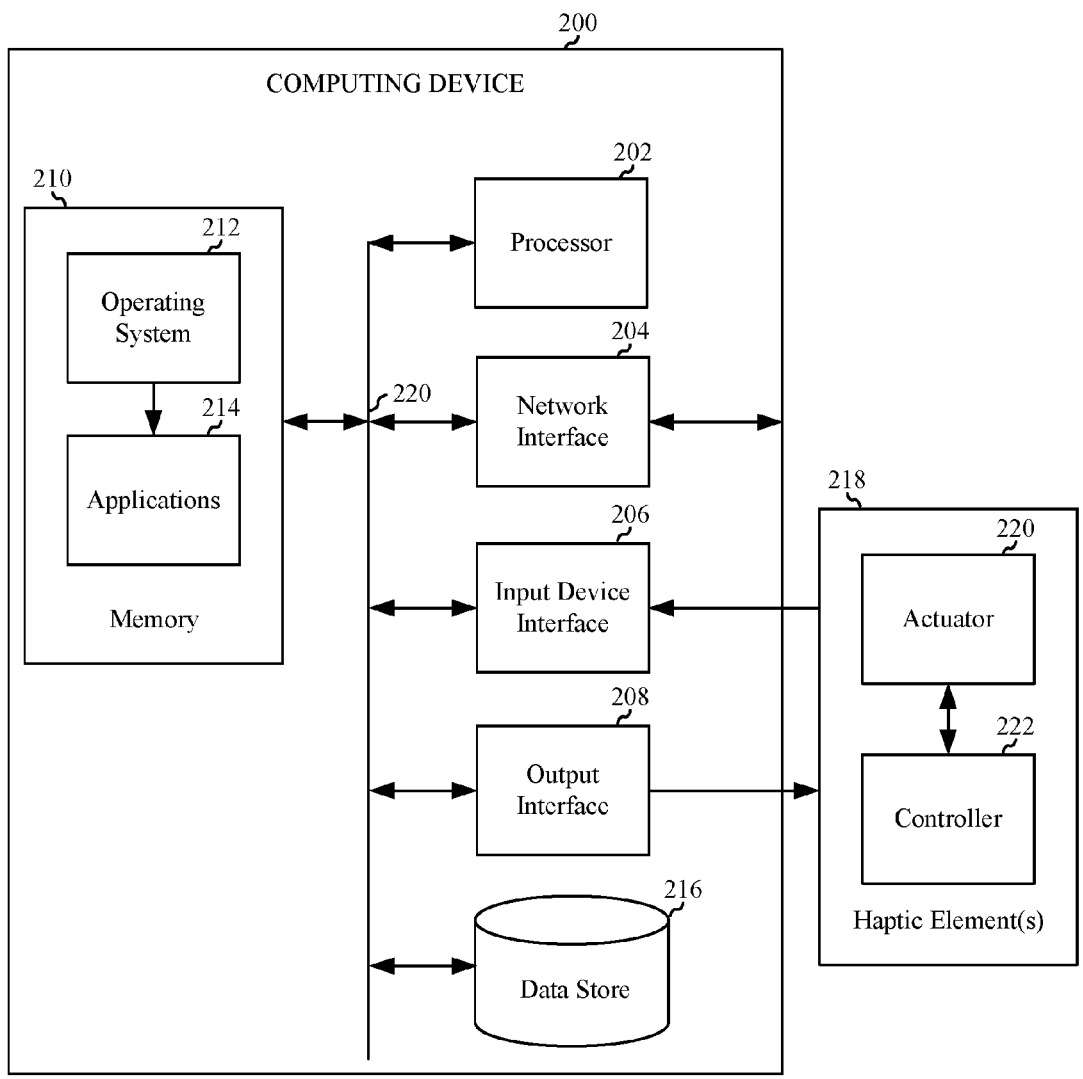
FIG. 3 illustrates a block diagram conceptually illustrating a computing device according to one aspect of the present disclosure.

Aspects of the present disclosure may be implemented as a computer implemented method in a computing device or computer system. These computing devices may include, but are not limited to, mobile phones, laptop computers, tablet computers, personal computers, workstations, mini- and mainframe computers, servers, and the like. The general architecture of a suitable computing device is described below with reference to FIGS. 2 and 3. More particularly, FIGS. 2 and 3 are block diagrams illustrating exemplary components of a computing device 200 suitable for communicating to a stylus using haptic technology. As implemented, a stylus may also include certain components illustrated in FIGS. 2 and 3 such as a processor, memory, I/O interfaces, etc. However, the following description of the exemplary components of a computing device 200 should be viewed as illustrative only and not construed as limiting in any manner. In one aspect, the user device 102 shown in FIG. 1 may be implemented as the exemplary computing device 200, for example.

With regard to FIGS. 2 and 3, FIG. 2 illustrates haptic element(s) 218 as being integrated into the computing device 200, and FIG. 3 illustrates the haptic element(s) 218 as a separate device connectable to computing device 200 through an input device interface 206. The exemplary computing device 200 may include a processor 202 in communication with a variety of other components over a system bus 220 or through a direct connection. These other components may include, by way of example, a network interface 204, an input device interface 206, an output interface 208, and a memory 210. As appreciated by those skilled in the art, the network interface 204 enables the computing device 200 to communicate data, control messages, data requests, and other information with other resources including computers, data sources, storage devices, and the like, on a computer network such as the Internet. The network interface 204 may be configured to communicate via wired or wireless connections. In this aspect, the computing device 200 may facilitate communication between an external device or system and the stylus. For example, the computing device may receive a communication and/or data via the network interface and transmit the communication and/or data to the stylus using haptic technology. Similarly, the computing device may receive a communication and/or data from the stylus and transmit the communication and/or data over a network to an external device or system.

The input device interface 206, sometimes also embodied as an input/output interface, enables the computing device 200 to obtain data input from a variety of devices including, but not limited to, a microphone, a digital pen, a touch screen, a keyboard, a mouse, a scanner, and the like. In addition to the exemplary components described above, an output interface 208 may be used for outputting information such as audio signals or display information. Display information may be output by the output interface 208 via a display device (e.g., a monitor or similar device, not shown), for example.

The processor 202 may be configured to operate in accordance with programming instructions stored in a memory 210. The memory 210 generally comprises RAM, ROM, and/or other memory. Thus, in addition to storage in read/write memory (RAM), programming instructions may also be embodied in read-only format, such as those found in ROM or other permanent memory. The memory 210 may store an operating system 212 for controlling the operation of the computing device 200. The operating system may be a general purpose operating system such as a Microsoft Windows operating system, a UNIX operating system, a Linux operating system, or an operating system specifically written for and tailored to the computing device 200. Similarly, the memory 210 may also store user-executable applications 214, or programs, for conducting various functions on the computing device 200. For example, the application 214 in memory 210 may be configured according to aspects of the present disclosure to control haptic communication of information and data.

The computing device 200 optionally includes a data store 216 for storing data and other information on the computing device 200. The computing device 200 also includes one or more haptic elements 218 for actuating or vibrating the touchscreen of the computing device 200 and/or the chassis of the computing device 200 and communicating data to a stylus device using haptic technology.

In an aspect, the haptic elements 218 include an actuator 220 and a controller 222. The actuator 220 actuates or vibrates the touchscreen of the computing device 200 and/or the chassis of the computing device 200 at the haptic frequency. The actuator 220 may be any actuator capable of providing the actuation or vibration the touchscreen of or the computing device 200 itself. The actuator 220 may be configured to operate to provide haptic feedback to users and/or to other devices, such as a stylus. For example, the actuator 220 may be an actuator based on both eccentric-rotating masses and linearly-reciprocating masses, an actuator based on piezoelectric materials, an electrostatic repulsion actuator, a high-voltage haptic actuator, or other type of actuator. Actuators based on both eccentric-rotating masses and linearly-reciprocating masses can be slow to accelerate and decelerate when electrical stimulus is started and stopped. Haptic actuators based on piezoelectric materials may include multilayer-slab piezoelectric actuators, coupled to a tungsten-carbide ballast mass and integrated into an enclosed driven-mass package. In an example, a piezoelectric bending-bar inertial linear resonant actuator may be used. In this example, the piezoelectric bending-bar inertial linear resonant actuator may have a resonant frequency of about 190-240 Hz, a root mean square (RMS) output at resonant frequency of about 1-2 G, maximum peak voltage of about 60-200 peak-to-peak voltage (Vpp), and a capacitive load of about 50-200 nanofarads. Electrostatic repulsion actuators, such as actuation systems, utilize high voltage waveforms to manipulate the realtime spatial relationship between very small structures in planar stackups of device elements.

In general, high-voltage haptic actuator technologies require a lower-voltage "initiator" section (which is often based on the circuit used for piezoelectric actuator drive), followed by a multistage cascade voltage multiplier, which creates the final high-voltage output waveform at a commensurately scaled lower current. One type of high-voltage haptic actuator, the artificial muscle electroactive polymer (EAP), utilizes closely-spaced polymer films and imprinted electrodes to mimic the tractive action of muscle tissue in biological systems. EAP is able to proportionally change the length and thickness of a constituent mass, (in this example, a dielectric polymer) through the application of a high bias voltage, and also exhibits a small restoring force through the elastic action of the polymer material itself. The EAP element is able to "pull" effectively over a range, and restore back over the same range, making it a useful unimorphic material. The artificial muscle actuator can be fashioned with multiple elements to deliver relatively high acceleration (and force) as well as very low resonant frequency when attached to a suspended ballast.

The controller 222 may be an integrated circuit (IC) that controls the actuator 220. For example, the controller 222 may drive voice-coil based linear resonant actuators, rotating-motor based eccentric mass actuators, and piezo-electric effect actuators of different types, typically based on rectangular, monolithic layers of a ceramic material lead zirconate titanate. In an example, the controller 222 may include a Texas Instruments DRV2667 integrated circuit, having an integrated boost stage capable of up to 200 Vpp output, an integrated synthesizer for sine-based waveforms, a memory for storing "8 by 8" (8-bit, 8 ksps) waveform samples, and being capable of accepting real-time streaming waveforms via inter-integrated circuit (I2C).

In an aspect, the controller 222 includes a built-in memory and is capable of performing complex patterns and/or arbitrary waveforms. In this aspect, the carrier based lock in amplifier approach can be used to transmit or communicate data to the stylus device while the stylus is in physical contact with the computing device 200. In one aspect, the computing device 200 communicates information to the stylus device through an analog to digital converter (A to D converter).

Figure 4:
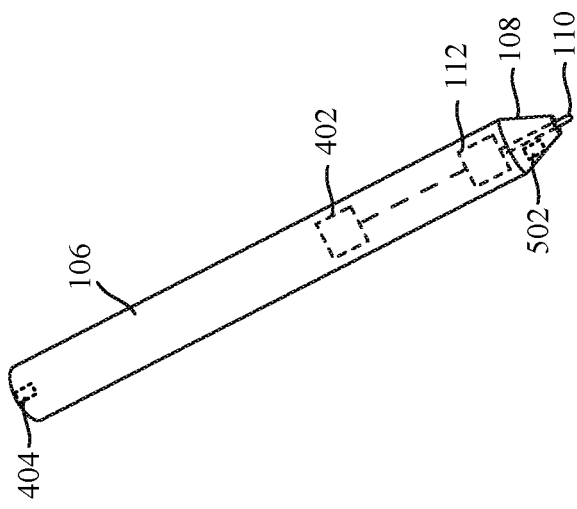
FIG. 4 illustrates a stylus device according to one aspect of the present disclosure.

FIG. 4 illustrates a stylus device 106 according to an aspect of the disclosure. The stylus device 106 is an active type stylus. In this aspect, stylus device 106 includes circuitry including a power source, and a pressure sensitive tip 110 coupled to a pressure sensor 112. The stylus device 106 may also include control circuitry 402, including, for example, memory, an IR transmitter or RF transmitter, and processor. The stylus device 106 communicates with the computing device using the control circuitry 402. For example, the stylus device 106 may include circuitry to determine X-Y location information from the touchscreen of the computing device and send or transmit the X-Y locations to the computing device. The circuitry may determine the X-Y locations by detecting changes in electrical capacitance, which occur when the active tip 108 of the stylus 106 is in close proximity to or touching the touchscreen of the computing device. The circuitry may determine the X-Y coordinates from the signal received from the computing device as detected by the active tip 108.

Figure 5:
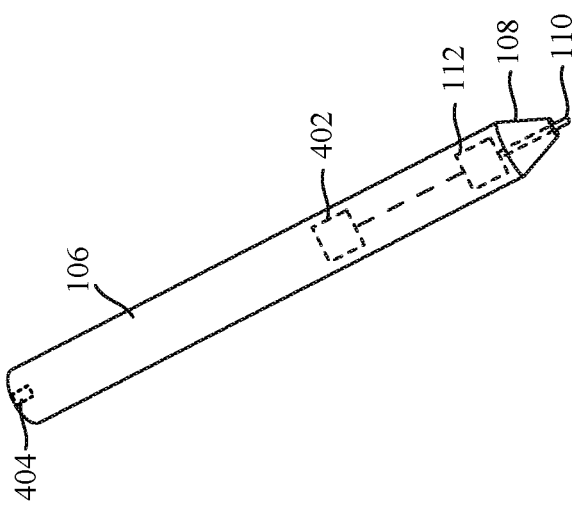
FIG. 5 illustrates another stylus device according to one aspect of the present disclosure.

In an aspect, the computing device causes the touchscreen to vibrate, and the stylus device 106 receives the vibrations via the pressure sensitive tip 110 and pressure sensor 112. In another aspect, the stylus device 106 may also include a MEMS microphone 502, as illustrated in FIG. 5. In this aspect, the MEMS microphone 502 may receive the vibrations.

These aspects allow two way communication from the stylus to the computing device (via the control circuitry 402) and from the computing device to the stylus device 106 (via haptic technology). In an aspect, the control circuitry 402 receives the data on the haptic carrier through an A to D converter, as described above. The control circuitry 402 then reads and stores the data, and communicates back to the computing device via RF or IR communication.

In an aspect, with reference to FIGS. 4 and 5, the stylus device 106 may also include a light emitting diode (LED) 404 adapted to provide a visual signal to the user. This signal may be an indication of power level, notification of an email, or other type of notification. In this aspect, the stylus can provide information to the user to alert the user of a certain event, which may be communicated to the stylus device 106 from the computing device using the haptic connection.

Figure 6:
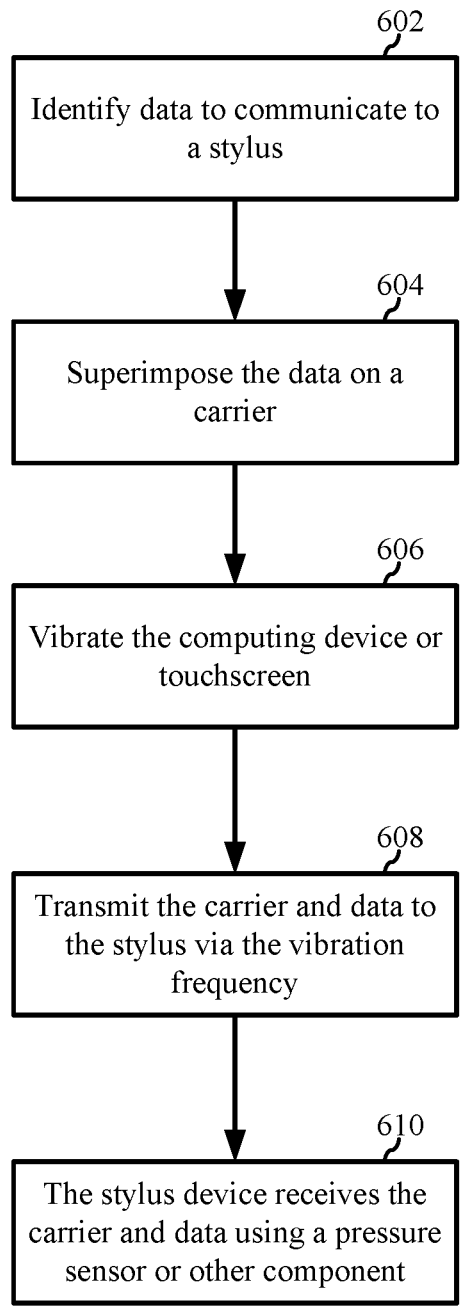
FIG. 6 is a flow diagram illustrating an exemplary method for performing haptic communication according to aspects of the present disclosure.

FIG. 6 is a flow diagram illustrating an exemplary method for performing haptic communication. As an example, one or more of the logical components of FIGS. 2, 4 and 5 may perform the methods disclosed herein. In block 602, the computing device identifies or determines data to be communicated to a stylus device. The computing device, for example the controller 222, then superimposes the data on a carrier wave, illustrated as block 604, i.e. the carrier wave or signal (a communications channel) is modulated (using frequency or amplitude modulation) by a baseband signal to carry analog or digital signal information, such as data, through vibrations at the haptic frequency. The computing device, for example the actuator 220, causes vibration of the computing device or touchscreen of the computing device, illustrated as block 606. The vibration transmits the carrier and data (via the haptic frequency) to a stylus device via the vibration frequency, illustrated as block 608. The stylus device receives the carrier and data using a pressure sensor or other component in the stylus device, illustrated as block 610.

Figure 7:
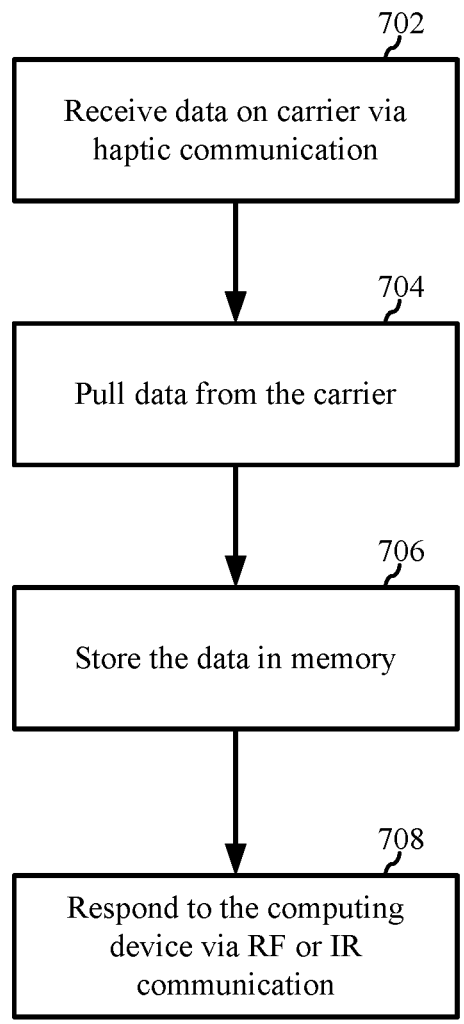
FIG. 7 is a flow diagram illustrating an exemplary method for performing haptic communication according to aspects of the present disclosure.

FIG. 7 is a flow diagram illustrating an exemplary method for performing haptic communication from the point of view of the stylus. As an example, one or more of the logical components of FIGS. 2-5 may perform the methods disclosed herein. In block 702, the stylus device receives the carrier wave with the data. The stylus then obtains the data from the carrier, illustrated as block 704. For example, the stylus extracts the baseband information from the incoming modulated carrier wave to obtain the data. The carrier recovery can be performed using a band-pass filter at the carrier wave and/or with a phase-locked loop. Once the data is obtained, the data may be stored in memory of the stylus, illustrated as block 706, and the stylus may respond to the computing device, for example, acknowledging receipt of the data, illustrated as block 708.

Figure 8:
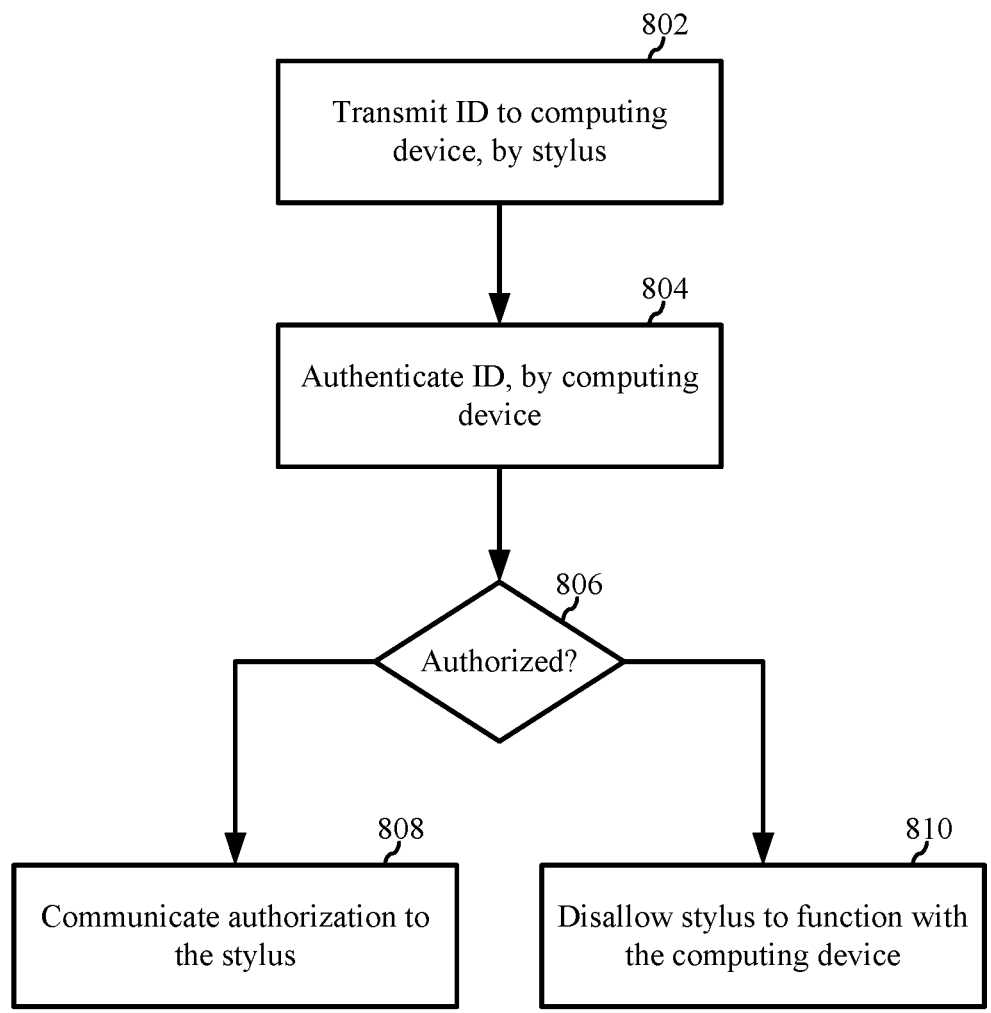
FIG. 8 is a flow diagram illustrating an exemplary method for performing stylus-device authorization using haptic communication according to aspects of the present disclosure.

The haptic communication link between the computing device and the stylus may be used for a variety of purposes, although those purposes may be limited by the communication rate from the device to the stylus. For example, the haptic communication link may be used to transmit data from the computing device 200 to the stylus device at a rate of about 20 to 40 symbols per second. In an aspect, the haptic communication may be used for identification and authorization of the stylus device with the computing device. FIG. 8 is a flow diagram illustrating an exemplary method for performing authorization using haptic communication. In block 802, the stylus device transmits an identification (ID) to the computing device, for example via RF or IR communication. The computing device then authenticates the stylus device's ID, illustrated as block 804, and determines whether the stylus ID is authorized, illustrated as block 806. If the stylus ID is authorized, the computing device and communicates an authorization back to the stylus using haptic communication, illustrated as block 808. However, if the stylus ID is not authorized, the computing device may disallow the stylus to function with the computing device, illustrated as block 810. This can provide a security type feature to the stylus and computing device and prevent other stylus devices from being used or communication with the computing device. The computing device may also customize certain operations based on the stylus IS and/or capabilities.

Figure 9:
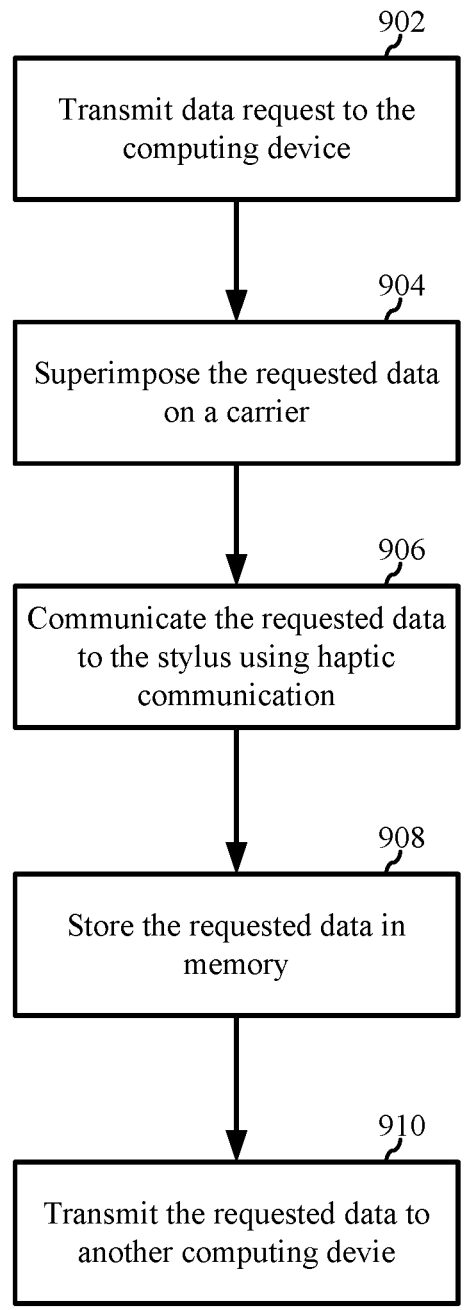
FIG. 9 is a flow diagram illustrating an exemplary method for performing copy and paste functionality using haptic communication according to aspects of the present disclosure.

In an aspect, the haptic communication may be used to provide a copy and paste functionality. FIG. 9 is a flow diagram illustrating an exemplary method for performing copy and paste functionality using haptic communication. In block 902, the stylus device transmits, for example via RF or IR communication, a copy command or request for data command to the computing device, for example for a portion of data that is highlighted or selected. The computing device receives the command via an input signal transmitted by the stylus device. The computing device superimposes the requested data on the carrier, illustrated as block 904, and transmits the data to the stylus device using haptic communication, illustrated as block 906. The stylus receives the data and stores the data in the stylus memory, illustrated as block 908. The stylus can then transmit the data to another computing device or the same computing device providing a copy and paste functionality, illustrated as block 910. This can provide a copy and paste functionality in which a stylus device can transfer data, for example a URL or link to a website, or other data from one computing device to another.

Figure 10:
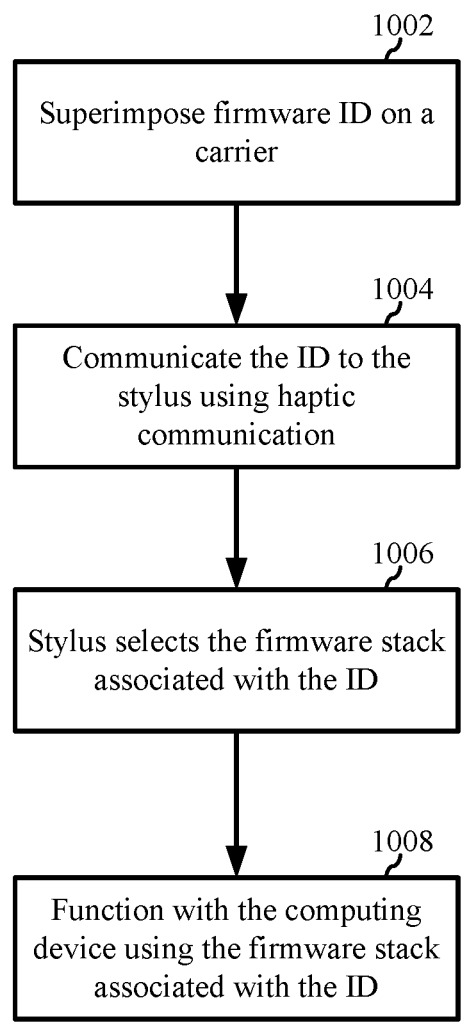
FIG. 10 is a flow diagram illustrating an exemplary method for selecting a firmware stack using haptic communication according to aspects of the present disclosure.

In an aspect, the stylus may be preprogrammed with different firmware stacks for operating with different computing devices. In this aspect, the computing device can communicate to the stylus device which firmware stack to use with the computing device by communicating a firmware stack identifier corresponding to a specific firmware stack to the stylus device. The stylus device may then use the firmware stack identifier to identify and/or locate the specific firmware stack in the memory of the stylus device. The stylus device may then configure its own operation, including its communications with the computing device, using the specific firmware stack. FIG. 10 is a flow diagram illustrating an exemplary method for communicating a firmware stack ID using haptic communication. In block 1002, the computing device superimposes an identifier or ID of a firmware stack on a carrier. The computing device then transmits the ID to the stylus device using haptic communication, illustrated as block 1004. The stylus device receives the ID and selects, from a number of preloaded firmware stacks, the firmware stack associated with the ID, illustrated as block 1006. The stylus can then function and communicate with the computing device using the correct or preferred firmware stack, illustrated as block 1008. Other stylus functionality, beyond firmware, may also be activated in this fashion.

Figure 11:
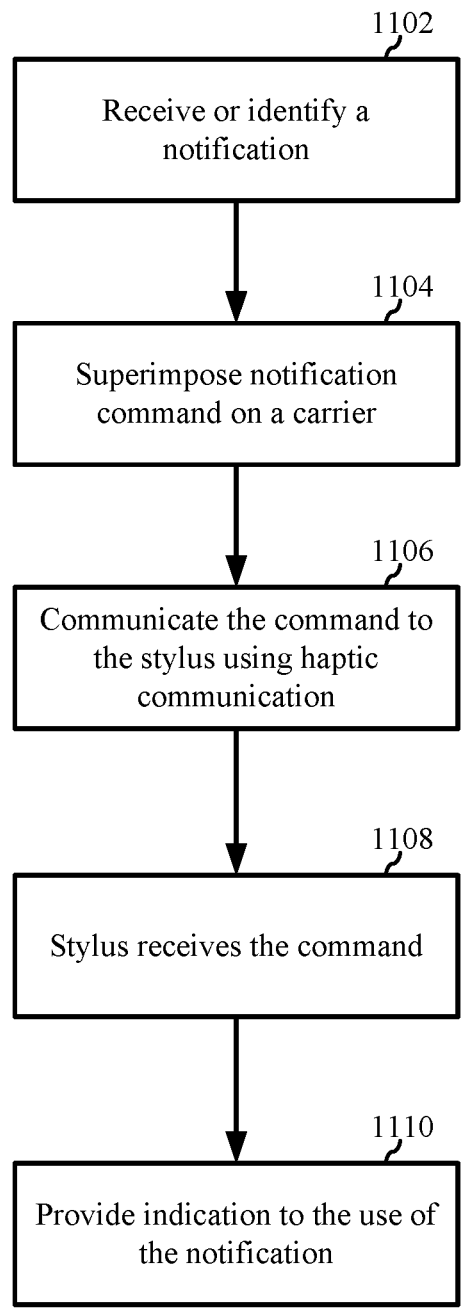
FIG. 11 is a flow diagram illustrating an exemplary method for communicating notifications to a stylus device using haptic communication according to aspects of the present disclosure.

In another aspect, the computing device may communicate notifications to a stylus device using haptic communication. It can be distracting to a user when email notifications and other such notifications pop-up or appear on a screen of the computing device and disrupt the user from performing the task at hand. In this aspect, the computing device can communicate to the stylus device power level, email notifications, and other types of notifications. FIG. 11 is a flow diagram illustrating an exemplary method for communicating a notification using haptic communication. In block 1102, the computing device receives or identifies a notification, for example, an incoming email. Instead of providing an on-screen notification to the user, the computing device may superimpose a notification command on a carrier, illustrated as block 1104. The computing device then transmits the command to the stylus device using haptic communication, illustrated as block 1106. The stylus device receives the notification command, illustrated as block 1108, and provides an indication, for example, via blinking LED 404 to the user, illustrated as block 1110.

While, certain examples are described above, any number of commands and types of low band information or data may be communicated from the computing device to the stylus. This allows the computing device and stylus to work together to enhance the user experience.

While the example described above allow for the communication of information or data from the computing device to a stylus, the computing device may also communicate information or data to a second device. For example, a first computing device may communicate information or data to a second computing device that is in contact with the first computing device, and vice versa. The computing device may also communicate information or data to other devices capable of receiving haptic communications.

As discussed above, the various embodiments may be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and protocols.

In a particular set of embodiments, the information may reside in a storage-area network ("SAN") familiar to those skilled in the art. Similarly, any necessary files for performing the functions attributed to the computers, servers, or other devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touchscreen, keypad, or microphone), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system or device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A stylus device, comprising:
   a body portion including a tip for contacting and interacting with a touchscreen of a computing device;
   a vibration sensor disposed in the body portion and adapted to receive first data including an identifier corresponding to a firmware stack from the computing device, wherein the first data is received through vibration experienced while the tip is in physical contact with the computing device; and
   a processor in communication with the vibration sensor and configured to:
     process the first data;
     select the firmware stack; and
     configure the stylus device to communicate with the computing device.

2. The stylus device of claim 1, wherein the stylus device is configured to select second data during an interaction between the stylus device and the computing device.

3. The stylus device of claim 2, further comprising a memory in communication with the processor and adapted to store the second data.

4. The stylus device of claim 3, further comprising a transmitter in communication with the processor, and wherein the stylus device is configured to transmit the second data from the stylus device to a second computing device.

5. The stylus device of claim 1, wherein the vibration sensor is adapted to receive a vibration at a haptic frequency from the computing device, the vibration comprising a carrier wave modulated with the first data.

6. The stylus device of claim 5, wherein the processor is adapted to extract baseband information from the modulated carrier wave to obtain the first data.

7. The stylus device of claim 1, wherein the vibration sensor is adapted to receive second data including an authorization code from the computing device, wherein the authorization code enables communications between the stylus device and the computing device.

8. The stylus device of claim 1, further comprising a transmitter in communication with the processor, and wherein the stylus device is configured to transmit a signal indicative of receipt of the first data to the computing device.

9. The stylus device of claim 8, wherein the signal is a radio frequency signal or infrared signal.

10. A method, comprising:
    receiving, by a stylus device, first data including an identifier corresponding to a firmware stack from a computing device, wherein the first data is received through vibration experienced while the stylus device is in physical contact with the computing device;
    processing, by the stylus device, the first data;
    selecting, by the stylus device, the firmware stack; and
    configuring, by the stylus device, the stylus device to communicate with the computing device.

11. The method of claim 10, further comprising transmitting, by the stylus device, a signal indicative of receipt of the first data to the computing device.

12. The method of claim 11, wherein the signal is a radio frequency signal or infrared signal.

13. The method of claim 10, further comprising receiving, by the stylus device, second data comprising an authorization code enabling communication between the stylus device and the computing device.

14. The method of claim 10, further comprising:
selecting, by the stylus device, second data during an interaction with the computing device; and
storing the second data in a memory of the stylus device.

15. The method of claim 14, further comprising further comprising transmitting, by the stylus device, the second data to a second computing device.

16. The method of claim 10, further comprising extracting, by the stylus device, baseband information from a modulated carrier wave to obtain the first data.

\* \* \* \* \*